United States Patent
Kerr

(10) Patent No.: US 8,654,884 B2
(45) Date of Patent: Feb. 18, 2014

(54) CHANNEL EQUALIZATION USING APPLICATION SPECIFIC DIGITAL SIGNAL PROCESSING IN HIGH-SPEED DIGITAL TRANSMISSION SYSTEMS

(75) Inventor: Benjamin James Kerr, Wootton Fields (GB)

(73) Assignee: Texas Instruments Incorporated, Dallas, TX (US)

( * ) Notice: Subject to any disclaimer, the term of this patent is extended or adjusted under 35 U.S.C. 154(b) by 424 days.

(21) Appl. No.: 13/087,168

(22) Filed: Apr. 14, 2011

(65) Prior Publication Data

US 2012/0044983 A1   Feb. 23, 2012

(30) Foreign Application Priority Data

Apr. 14, 2010   (GB) ................. 10159866.2

(51) Int. Cl.
*H04B 15/00*   (2006.01)
(52) U.S. Cl.
USPC ........... 375/285; 375/297; 375/296; 375/324; 375/254
(58) Field of Classification Search
USPC ......................... 375/285, 297, 296, 324, 254
See application file for complete search history.

(56) References Cited

U.S. PATENT DOCUMENTS

| | | | |
|---|---|---|---|
| 5,905,760 A * | 5/1999 | Schnabl et al. ............. | 375/296 |
| 8,351,875 B2 * | 1/2013 | Kato et al. ................. | 455/114.2 |
| 2006/0188043 A1 | 8/2006 | Zerbe et al. | |
| 2009/0113429 A1 | 4/2009 | Luschi et al. | |
| 2010/0061488 A1 * | 3/2010 | Endres et al. ............. | 375/326 |

FOREIGN PATENT DOCUMENTS

WO   2006032149 A1   3/2006

OTHER PUBLICATIONS

Jafri, A. R., et al., "ASIP-Based Flexible MMSE-IC Linear Equalizer for MIMO Turbo-Equalization Applications," Design, Automation & Test in Europe Conference and Exhibition, 2009. Date '09, IEEE, Piscataway, NJ, USA, Apr. 20, 2009, pp. 1620-1625, XP031478025, ISBN: 978-1-4244-3781-8, the whole document.

(Continued)

*Primary Examiner* — Kabir A Timory
(74) *Attorney, Agent, or Firm* — John R. Pessetto; W. James Brady; Frederick J. Telecky, Jr.

(57) ABSTRACT

A method and circuit for performing channel equalization in a high speed transmission system comprising a transmitter and receiver. An application specific digital signal processor, ASDSP, performs channel equalization and compensation on digital data received from an analogue-to digital converter of the receiver. The ASDSP is operable to execute an application specific set of op-codes needed for performing channel equalization and compensation. An ASDSP register is coupled between the ASDSP and a system CPU in a feedback loop for performing channel equalization at the receiver. The ASDSP stores equalizer parameters and bit error rate measurements used by the ASDSP for performing channel equalization and compensation. An ASDSP program storage memory, coupled to and accessible by the ASDSP, stores an ASDSP microsequence program for controlling the processing steps for channel equalization and dataflow through the ASDSP.

17 Claims, 5 Drawing Sheets

(56) References Cited

OTHER PUBLICATIONS

Amini, P. et al., "An Experimental Cognitive Radio for First Responders," New Frontiers in Dynamic Spectrum Access Networks, 2008. DYSPAN 2008. 3rd IEEE Sumposium on, IEEE, Piscataway, NJ, USA, Oct. 14, 2008, pp. 1-6, XP031353318, ISBN: 978-1-4244-2016-2, figure 2b.

Bagheri, Rahim, et al., "An 800=MHz-6-GHz Software-Defined Wireless Receiver n 90-nm CMOS," IEEE Journal of Solid-State Circuits, IEEE Service Center, Piscataway, NJ, US, vol. 41, No. 12, Dec. 1, 2006, pp. 2860-2876, XP011150713, ISSN: 0018-9200, DOI: 10.1109/JSSC.2006.884835, p. 2862, Section III.B.

Sunwoo, Myung Hoon, et al., "Implementation of Application-Specific DSP and OFDM Systems," Circuits and Systems, 2004. ISCAS '04. Proceedings of the 2004 International Symposium on, May 23, 2004, pp. 665-668, XP010719691, ISBN: 978-0-7803-8251-0, p. 667, Section 3.2.

* cited by examiner

CHANNEL EQUALIZATION USING APPLICATION SPECIFIC DIGITAL SIGNAL PROCESSING IN HIGH-SPEED DIGITAL TRANSMISSION SYSTEMS

FIELD OF THE INVENTION

This application claims priority under 35 USC §119(e)(1) of European Application Number 10159866.2, filed on Apr. 14, 2010. The present invention relates to channel equalization in transmission systems. In particular, the invention relates to channel equalization using application specific digital signal processing in a high speed transmission system.

BACKGROUND OF THE INVENTION

High speed data transfer between semiconductor devices in an electronic system may be achieved by the use of a serialiser/deserialiser (SerDes). In order to avoid the use of a plurality of parallel connections between devices, a single differential analogue path is used running at a high data rate. One exemplary arrangement is specified by IEEE 802.3/AE/AP.

The interconnect between the transmitter and receiver device, known as a transmission channel, distorts the serial data signal to varying extents. The transmission channel is the electrical path between the transmitter and receiver, and is susceptible to noise and interference.

As serial interface transmission speeds increase, the channel losses present in the transmission medium become harder to equalize in order to maximize the bit-error-rate (BER) of the transmission system. Additionally, the losses also increase as the transmission channel length increases. It becomes increasingly difficult to equalize the transmitted and received waveforms in order to compensate for the channel losses. As SerDes transmission rates approach 40 GBits/sec and head towards 100 GBits/sec, a novel means of performing channel equalization is required that can exploit possible future silicon technologies.

SUMMARY OF THE INVENTION

The present invention provides a circuit for performing channel equalisation in a high speed transmission system comprising a transmitter and receiver. The circuit comprises an application specific digital signal processor (ASDSP) for performing channel equalisation and compensation on digital data received from an analogue-to digital converter of the receiver, an ASDSP register for storing equalisation parameters and bit error rate measurements, and an ASDSP program storage memory for storing an ASDSP micro-sequence program for controlling the processing steps for channel equalisation and dataflow through the ASDSP. The ASDSP is operable to execute an application specific set of operation codes (op-codes) needed for performing channel equalisation and compensation. An op-code is the portion of a machine language instruction that specifies what action or operation is to be performed by the processor. The ASDSP register is coupled between the ASDSP and a system CPU in a feedback loop for performing channel equalisation at the receiver, and the ASDSP program storage memory is coupled to and accessible by the ASDSP.

According to a first aspect, there is provided a circuit for performing channel equalisation in a high speed transmission system comprising a transmitter and receiver, the circuit comprising: an application specific digital signal processor, ASDSP, for performing channel equalisation and compensation on digital data received from an analogue-to digital converter of the receiver; an ASDSP register for storing equalizer parameters and bit error rate measurements, and coupled between the ASDSP and a system CPU in a feedback loop for performing channel equalisation at the receiver; an ASDSP program storage memory, coupled to and accessible by the ASDSP, for storing an ASDSP micro-sequence program for controlling the processing steps for channel equalisation and dataflow through the ASDSP. The ASDSP is operable to select an equalizer and or a clock and data recovery CDR function from a plurality of different equalizer and CDR algorithms, and to execute an application specific set of op-codes for performing the selected equalizer and CDR algorithms based on information received by the ASDSP pertaining to any one of: external or internal adaptations, constraints imposed by the system CPU, and selection criteria comprising optimization criterion stored in the ASDSP register.

Preferably, a system CPU is coupled to the ASDSP program storage memory. The system CPU is operable to determine whether an optimization criterion is met by the received equalized data signal, and is operable to send a control signal to the ASDSP program storage memory to update the micro-sequence program if the optimization criterion is not met by the received equalized data signal.

According to a second aspect, there is provided a method of performing channel equalisation in a high speed transmission system comprising a transmitter and receiver, the method comprising the steps of: selecting an equalizer and/or a clock and data recovery CDR function from a plurality of different equalizer and CDR algorithms based on information received by an application specific digital signal processor ASDSP pertaining to any one of: external or internal adaptations, constraints imposed by the system CPU, and predetermined operating conditions; executing an application specific set of op-codes for performing the selected equalizer and CDR algorithms on digital data received from an analogue-to-digital converter of the receiver, using the application specific digital signal processor ASDSP; controlling the processing steps for channel equalisation and dataflow through the ASDSP using an ASDSP micro-sequence program; reading equalizer parameters and bit error rate measurements stored in an ASDSP register; calculating channel equalization and compensation, on the basis of the equalizer parameters and bit error rate measurements, to be applied by the ASDSP to the received digital data at the receiver and to the data to be transmitted at the transmitter; and applying channel equalization and compensation to the received digital data at the receiver and to the data to be transmitted at the transmitter.

According to a further aspect of the invention, a SerDes data transfer system is provided that comprises a data receiver having a circuit in accordance with the first aspect.

According to another aspect, a SerDes data transfer system is provided that comprises a data receiver including a channel equalization arrangement operating in accordance with the method of the second aspect of the invention.

Thus, the present invention provides a highly programmable solution to the challenges faced when implementing channel equalization in high speed transmission systems, for example a SerDes system at very high transmission rates, in order to obtain a working, reliable system capable of operating over long distances with an acceptable BER.

Further embodiments of the invention are as set forth in the appended claims.

Examples of the invention will now be described with reference to the accompanying drawings, of which:

DESCRIPTION OF SPECIFIC EMBODIMENTS OF THE INVENTION

Figure 1:
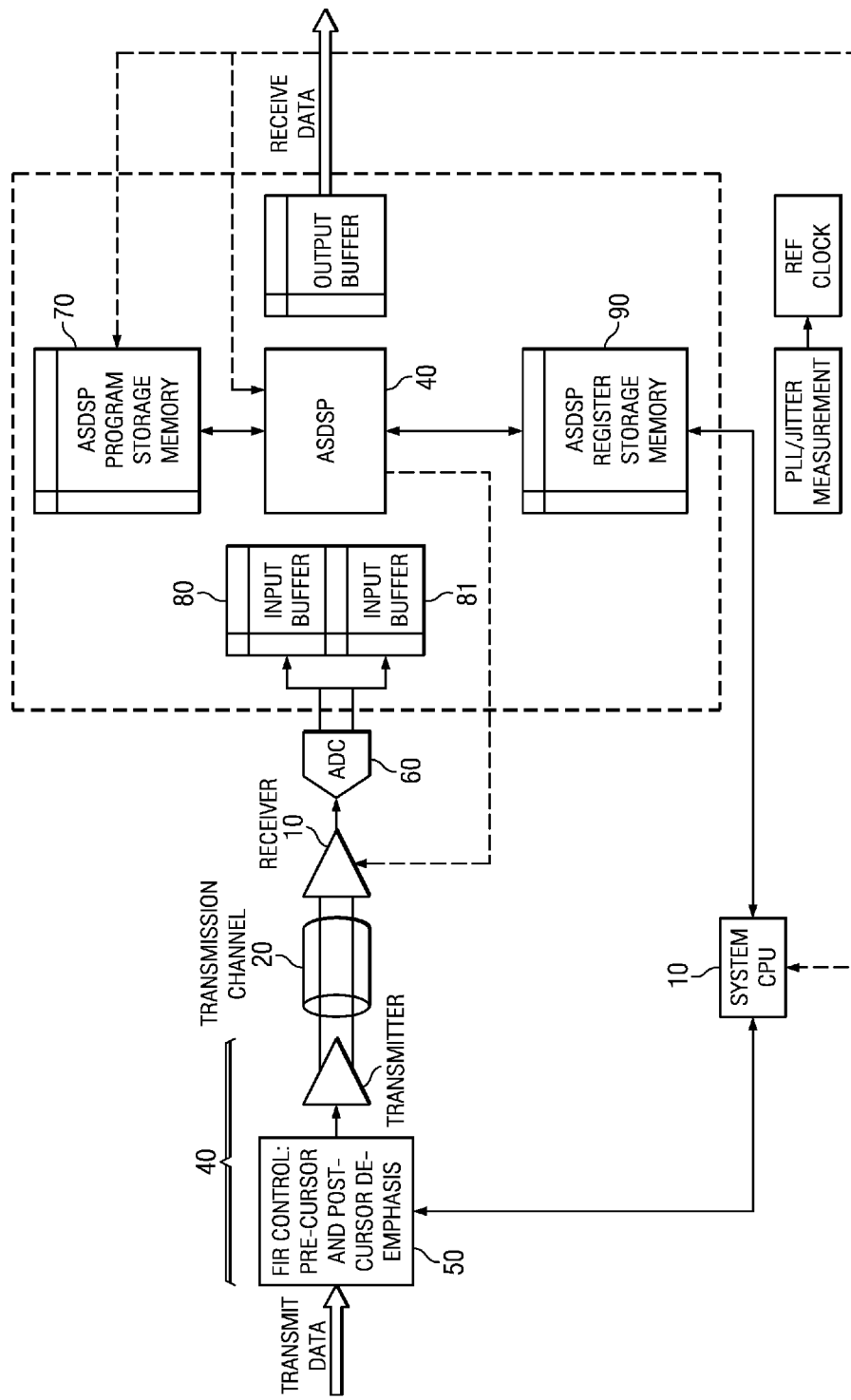
FIG. 1 is a schematic diagram showing an overview of a SerDes architecture in accordance with a preferred embodiment of the invention.

The term "couple" or "couples" is intended to mean either an indirect or direct electrical connection. Thus, if a first device couples to a second device, that connection may be through a direct electrical connection, or be through an indirect electrical connection via other devices or connections.

A key challenge facing designers of high-bandwidth systems such as data-routers and super-computers is the requirement to transfer large amounts of data between ICs—either on the same circuit board or between boards. This data transmission application is called Serialisation-Deserialisation or "SerDes" for short. The present invention is useful in SerDes circuits and indeed was developed for that application. Nonetheless the invention may be used in other applications.

Analysis of typical backplane channel attenuation (which is around −24 dB) and package losses (−1 to −2 dB) in the presence of crosstalk predict that an un-equalized transceiver provides inadequate performance and that decision feedback equalization (DFE) is needed to achieve error rates of less than $10^{-17}$.

Traditional decision-feedback equalization (DFE) methods for SerDes receivers rely on either modifying, in analogue circuitry, the input signal based on the data history ["A 6.25 Gb/s Binary Adaptive DFE with First Post-Cursor tap Cancellation for Serial backplane Communications" R Payne et al ISSCC 2005; "A 6.4 Gb/s CMOS SerDes Core with feed-forward and Decision Feedback Equalization" M. Sorna et al ISSCC 2005; "A 4.8-6.4 Gb/s serial Link for Backplane Applications Using Decision Feedback Equalization" Balan et al *IEEE JSSC* November 2005.] or on having an adaptive analogue slicing level ["Techniques for High-Speed implementation of Non-linear cancellation" S. Kasturia *IEEE Journal on selected areas in Communications*. June 1991.] (i.e. the signal level at which the circuit decides whether the signal represents a 1 or a 0).

In the preferred embodiment of the invention as implemented in SerDes architecture, it can be shown that moving channel equalization functions from the analogue domain to the digital domain results in improved equalizer performance and reduced power consumption. The equalization functions performed by this architecture are feed-forward equalization (FFE) and decision feedback equalization (DFE). It can be mathematically shown that both these equalizers are performing z-domain transformations of the sampled input waveform obtained from one or more analogue-to-digital converters. Preferably, in addition, automatic gain control functions are also performed by the architecture in the digital domain.

In a preferred embodiment, the invention generalizes the equalization and gain control behaviours into a flexible, programmable entity known as a digital signal processor (DSP). DSPs are employed in many systems where a sampled analogue waveform must be digitally manipulated by applying z-domain transformations. Most DSPs used today are designed to be generic devices with a large set of operating instruction (op-codes), and therefore tend to be inefficient, since there may be redundant op-codes that are never used in a particular application. Furthermore such generic DSPs employ one thousand plus op-codes and thus a large instruction space is needed to store them all. Also a considerable amount of time is required to search, access and execute a selected op-code.

By analyzing the digital signal processing functions that are actually required in a channel equalization system, a targeted application specific DSP (ASDSP) can be constructed. This type of DSP can operate much more efficiently, and therefore operate faster and consume less power, compared to using a traditional generic DSP. This is one of the features that allows a DSP to be used with the very high data processing requirements of a channel equalization system.

More specifically and in accordance with the present invention, the targeted ASDSP employs a set of application specific op-codes for performing the required channel equalization and compensation functions. This has the effect of reducing the number of op-codes from around a thousand to around less than a hundred.

A block diagram of a SerDes receiver circuit 10, which forms part of an integrated circuit, in which the present invention may be used is shown in FIG. 1. The invention may nonetheless be used in other applications, as previously stated.

In the receiver circuit 10 of FIG. 1 the input data is sampled at the baud-rate, digitized and the equalization and clock & data recovery (CDR) functions performed using numerical digital processing techniques executed by the ASDSP. This approach results in a superior power/area scaling with the process of digital circuitry compared to that of analogue, simplifies production testing, allows straightforward integration of a feed-forward equalizer and provides a flexible design with a configurable number of filter taps in the decision feedback equalizer.

The SerDes section of the integrated circuit, which includes the receiver circuit 10 is also provided with a transmitter 30, connected to transmit data over a parallel channel 20 to that which the receiver circuit 1 is connected to receive data. The transmitter 30 comprises a tap FIR filter 50 to pre-compensate for channel impairments. In many applications the integrated circuit transmitting data to the receiver circuit 10 uses pre-compensation and in particular a similar transmitter circuit 30, but in other applications the receiver circuit 10 works without pre-compensation being used at the transmitter.

The digital samples output from the analogue-to-digital-converter (ADC) circuitry 60 are interleaved and the resulting stream of samples is fed into an application specific digital signal processing data-path, in accordance with the present invention, that controls the numerical feed-forward equalization and decision-feedback equalization.

The ASDSP 40 comprises circuitry to implement the major components for channel equalization, and a basic micro-sequence program to control the processing steps. The micro-sequence program is preferably stored in ROM or RAM of an ASDSP program storage memory 70 that can be altered dynamically by system-level software. Data-flow through the ASDSP 40 is controlled by the micro-sequence, and as a result, can be altered for varying physical and/or environmental conditions. For example, a system can dynamically tune the equalization algorithm over time to compensate for changes in temperature or voltage, as explained further below in connection with FIG. 3.

The ADC circuitry 60 preferably consists of two or more ADCs, the digital outputs of which are coupled to an interleaver, preferably a Time Division Multiplexer (TDM). Where more than one analogue-to-digital converter is used, a further advantage of the ASDSP 40 is that it can compensate for the implementation differences between the analogue-to-digital converters. Also, since the ASDSP architecture would be required to buffer a number of samples before processing, the difficult task of implementing the discreet DFE would be eliminated. The output of the interleaver is coupled to a pair of input storage buffers 80, 81 associated with the ASDSP 40. The input storage buffers 80, 81 can be external to the ASDSP 40 or can be a part of the ASDSP system, and buffer the interleaved digital data as it is received at the ASDSP 40. The input storage buffers 80, 81 are configured in a 'ping-pong' arrangement whereby while one input buffer is being filled with received digital data, the other is supplying the digital data stored therein to the ASDSP. Preferably, automatic gain control (AGC) is implemented by the ASDSP running an AGC algorithm specified by an op-code. Alternatively AGC circuitry is coupled between the interleaver and input buffers 80, 81, and is controlled by the ASDSP 40.

The ASDSP program storage memory 70 coupled to the ASDSP can be implemented as either an internal or external memory. The ASDSP 40 running under the control of a micro-sequence program executes ASDSP op-codes for operating on the incoming buffered data in accordance with selected channel equalization and compensation functions comprising various equalizer and CDR algorithms.

Figure 5:
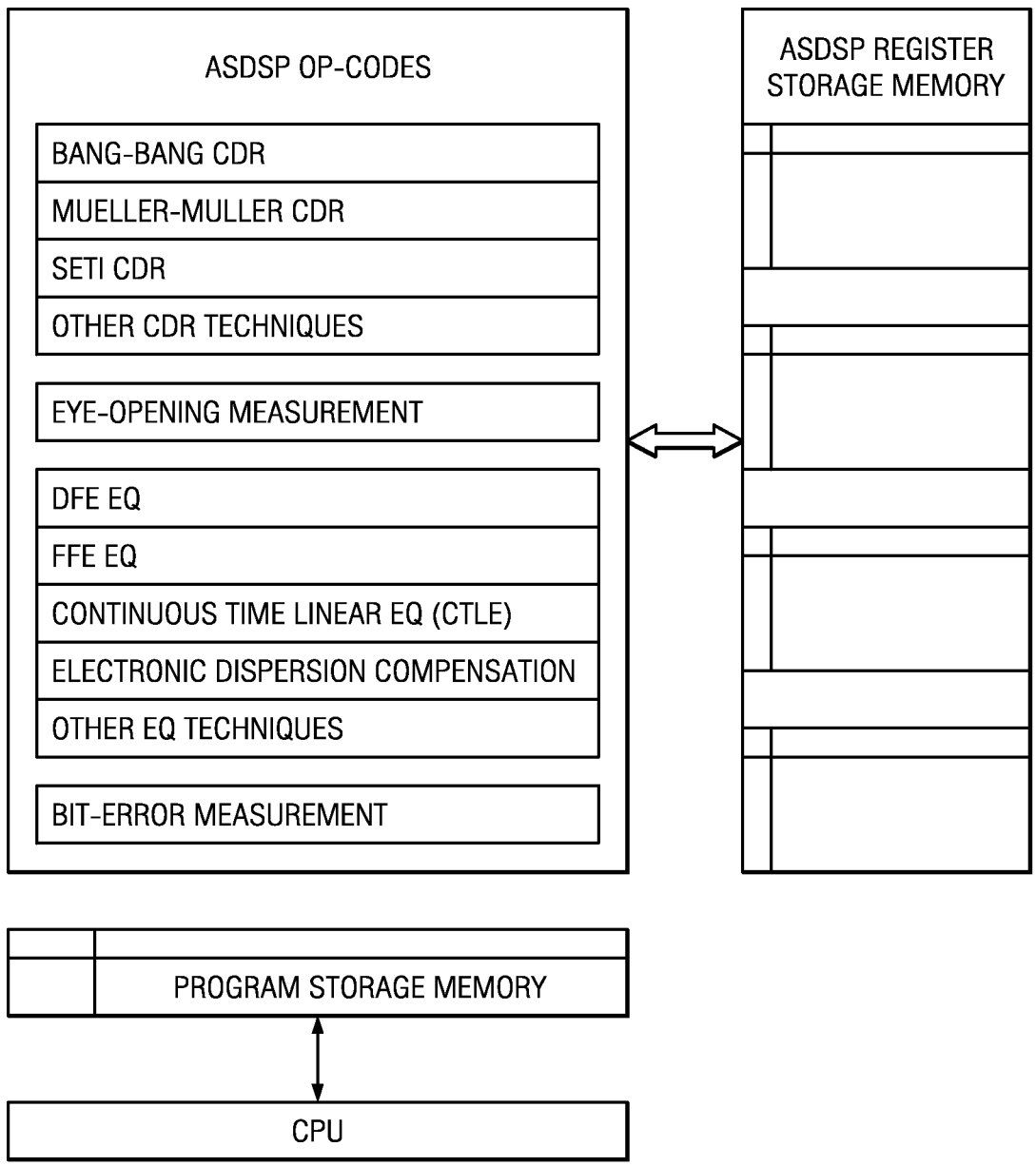
FIG. 5 is a schematic diagram of an ASDSP in accordance with a preferred embodiment of the invention.

With reference to FIGS. 1 and 5, the ASDSP 40 is also coupled to an ASDSP register 90 for storing equalizer parameters, eye opening measurements and bit error rate measurements. These parameters and measurements are accessed by the ASDSP 40 when performing channel equalization and compensation functions such as feed forward equalization and decision feedback equalization, and when performing clock and data recovery, and preferably are updated periodically by the ASDSP.

The ASDSP register 90 is also coupled to a system CPU 100 which in turn is coupled to the transmitter circuit 30. The CPU 100 can retrieve any of the equalizer parameters, eye opening measurements and bit error rate measurements from the ASDSP register 90, and on the basis of the retrieved values can send a control signal to compensation circuitry 50 in the transmitter circuit 30. The compensation circuitry 50 applies pre-compensation/feed forward equalization to the data to be transmitted on the basis of the control signal from the CPU. The compensation circuitry 50 comprises a finite-impulse response (FIR) filter with preferably three taps, although any number of weighted taps may be used that can provide the required amount of pre-compensation/feed forward equalization to the data to be transmitted.

In the preferred embodiment, the CPU 100 is also coupled to ASDSP program storage memory 70, and can send control signals to alter or control the micro-sequence program that controls dataflow through the ASDSP 40 in response to varying physical and/or environmental conditions, such as temperature or voltage for example. Preferably, the CPU 100 is coupled to the ASDSP 40 as well as, or instead of, the ASDSP program storage memory 70.

For any system in which the present invention would be employed, the approximate length of the transmission channel would be known, and this information would be used during the modelling stage to determine all the applicable equalization algorithms, including CDR and AGC algorithms to use for the system. The appropriate op-codes for those algorithms would then be selected for producing the required ASDSP software and storing it in the ASDSP program memory. A more detailed explanation of this process is discussed further below in conjunction with FIG. 4.

Figure 2:
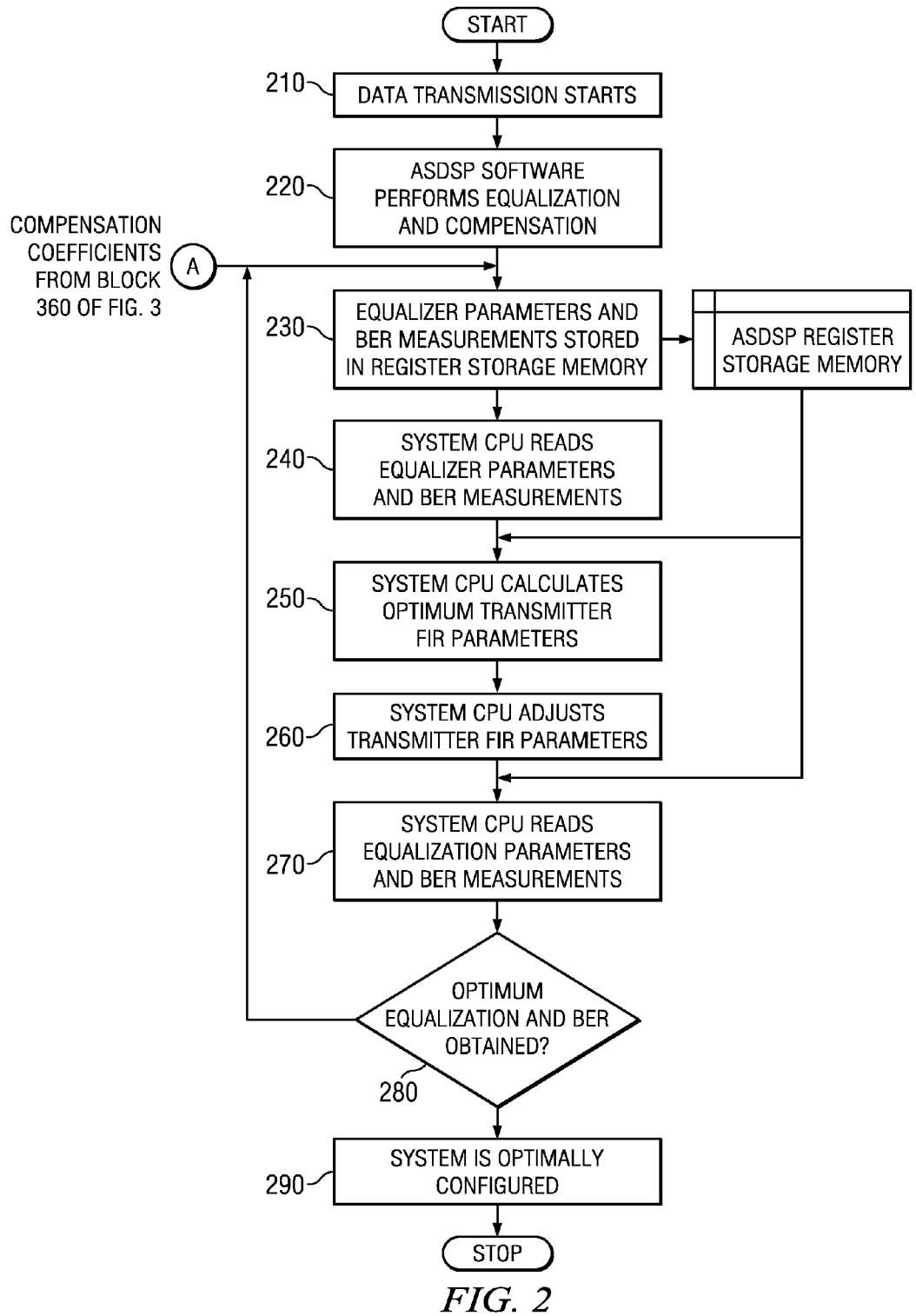
FIG. 2 is a flowchart diagram showing a method of channel equalization using application specific digital signal processing in a high data rate transmission system, in accordance with a preferred embodiment of the invention.

Referring again to FIGS. 1 and 5, on initialisation of the receiver, the ASDSP 40 works iteratively through each equalization algorithm and/or CDR algorithm until an optimum threshold value, operating range, upper/lower limit, target, or BER is achieved with a certain algorithm combination. The identified equalization algorithm and/or CDR algorithm are then performed by the ASDSP on the received data signal through the execution of specified op-codes until such time that the equalized received data signal deviates from the specified optimum threshold value, operating range, upper/lower limit, target or BER. With reference to FIG. 2, examples of various CDR algorithms or functions that can be selected by the ASDSP are Bang-Bang CDR, Mueller-Muller CDR, SETI CDR as described in co-pending UK patent application by the Applicant entitled "Data Slicing Level and Timing Adjustment", filed 14 Apr. 2011. Examples of various equalizer algorithms or functions that can be implemented by the ASDSP are DFE, FFE, Continuous Time Linear Equalizer (CTLE), and electronic dispersion compensation. The BER is measured using a counter to record the number of errors detected during a defined period of time.

The various selection criteria such as optimal threshold values, operating range, upper/lower limit, target or BER, as well as eye opening measurements, are stored in the ASDSP register storage memory, and are employed by the ASDSP to detect any deviation of the equalized received data signal. At such time that the equalized received data signal is determined to deviate from the specified optimal value, the ASDSP records a violation, updates the equalizer parameters stored in the ASDSP register storage memory, and sends an interrupt signal to the system CPU. Preferably, the ASDSP may record a different type of violation depending on the type of deviation from the selection criteria, and send a specified interrupt signal indicating the nature of the violation to the system CPU. Upon receiving the interrupt signal, the system CPU reads the equalizer parameters, BER measurements, and eye opening measurements from the ASDSP register storage memory, to determine a more appropriate channel equalization and compensation algorithm and/or CDR algorithm or functions for the ASDSP to employ. Alternatively, the system CPU periodically polls the ASDSP and/or accesses the ASDSP register storage memory for equalizer parameters, eye opening and BER measurements, to determine a more appropriate channel equalization and compensation algorithm and/or CDR algorithm or functions for the ASDSP to employ.

The system CPU then sends control signals to alter or control the micro-sequence program that controls dataflow through the ASDSP 40 to run those op-codes needed to implement the required channel equalization and compensation algorithm and/or CDR algorithm or functions.

Eye opening measurements are obtained by the ASDSP, or alternatively by the system CPU, by taking eye opening measurements of the received data in accordance with known techniques, and the number of errors in the received data signal determined over a specified time period is tracked using a counter and stored in the ASDSP register storage memory as the BER measurement.

A digital phase locked loop/phase interpolator circuit is coupled to the ASDSP and is used to compare the recovered clock signal obtained by the ASDSP whilst performing a CDR function, with a local clock reference signal to determine the phase difference and jitter for the received data signal. The digital PLL/phase interpolator circuit supplies the local clock reference signal, the phase difference and/or jitter measurements to the ASDSP for performing the required channel equalisation and compensation algorithm and CDR algorithm or functions, and can be stored in the ASDSP register storage memory for subsequent use in CDR selection.

The equalized and compensated received data signal is finally output from the ASDSP into an output buffer from where the data can be supplied to other circuitry in the receiver.

FIG. 2 is a flowchart showing the main steps involves in performing channel equalization using application specific digital signal processing in a high data rate transmission system, such as SerDes, in accordance with a preferred embodiment of the invention. Once data transmission begins 210, the data received at the receiver is converted to a digital signal and interleaved before being operated on by ASDSP software executed by the ASDSP running under the control of a micro-sequence program. Preferably the AGC and clock compensation is performed by the ASDSP 40. Alternatively, the interleaved digital signal can undergo automatic gain control (AGC) before being passed to the input storage buffers 80, 81 feeding the digital data signal to the ASDSP 40.

The ASDSP software comprises ASDSP op-codes for operating on the incoming buffered data in accordance with a selected channel equalization and compensation algorithm or functions 220. Equalizer parameters, eye opening measurements and BER measurements for calculating the pre-compensation and equalization to be applied, are stored in the ASDSP register 230, and are used by the ASDSP for performing channel equalization compensation. The channel equalization compensation may comprise any of decision feedback equalization, pre-compensation/feed forward equalization, clock and data recovery compensation, and automatic gain control compensation. Preferably, the equalizer parameters, eye opening and BER measurements are stored in a lookup table in the ASDSP register, and may be updated by the ASDSP. Preferably the ASDSP channel equalization and compensation algorithm is indexed to facilitate the incorporation of feedback and adjustment dynamically.

In another embodiment, the system CPU reads the equalizer parameters and BER measurements from the ASDSP register 240. The system CPU then calculates the optimum transfer FIR parameters to use on the basis of the equalization parameters and BER measurements 250. The system CPU adjusts the transmitter FIR parameters used to apply pre-compensation/feed forward equalization in the transmitter, on the basis of its calculations 260, or periodically, or when the BER exceeds a predetermined threshold or limit.

In any preferred embodiment, after the CPU reads the equalization parameters and BER measurements stored in the ASDSP register 270, it determines whether these values enable optimum equalization and BER to be achieved by the system 280. The CPU can monitor the BER and operate an iterative loop to get the BER as low as possible, or try to obtain a maximally open-eye at the receiver. If the determination is positive then no further adjustment is necessary of the equalizer parameters and BER measurements stored in the ASDSP register by the CPU. However if a non-optimal determination is made then the process continues from block 230 and the CPU takes a (new/further) reading of equalizer parameters and BER measurements stored in the ASDSP register 240 and continues by calculating the optimum transfer FIR parameters to use for applying pre-compensation/feed forward equalization in the transmitter.

Figure 3:
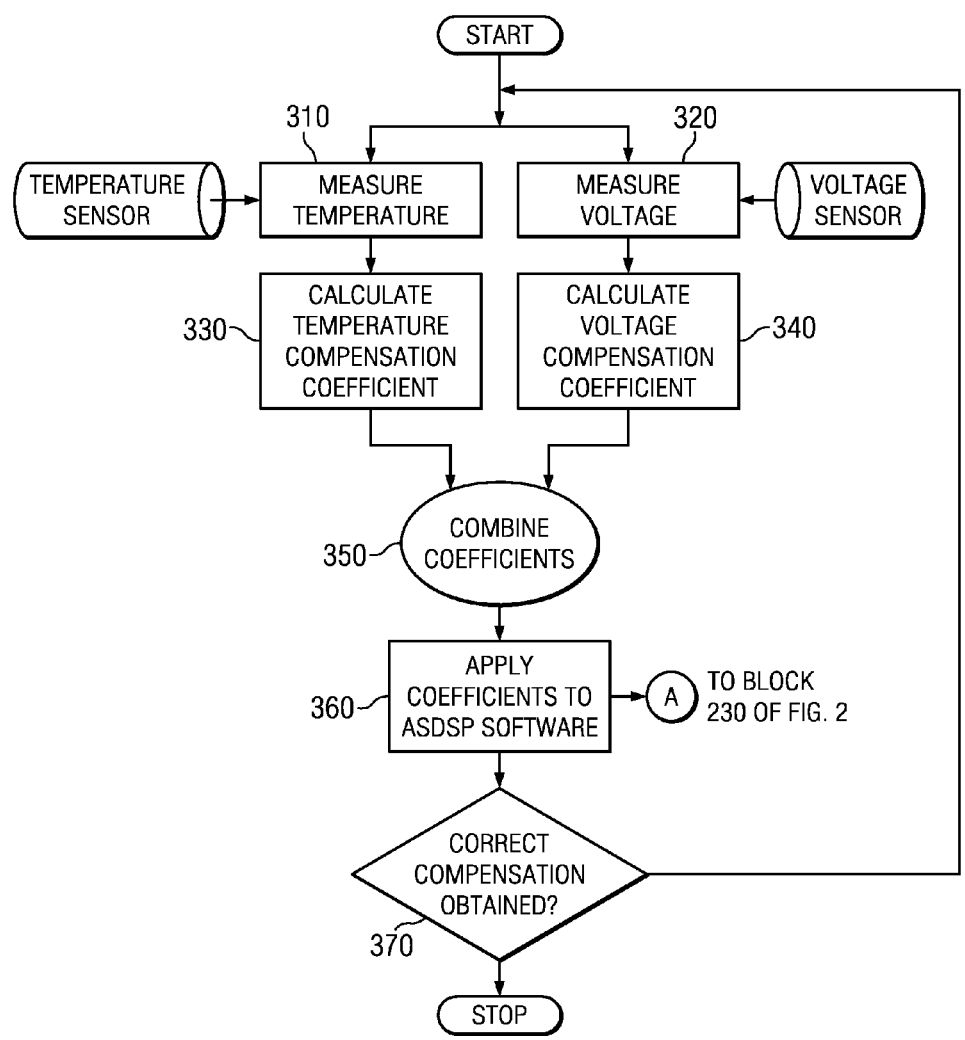
FIG. 3 is a flowchart diagram of an ASDSP temperature and voltage compensation process according to a preferred method of the present invention.

FIG. 3 shows a flowchart for understanding the main steps involved in dynamically tuning the equalization algorithm over time to compensate for changes in temperature or voltage. Voltage measurements 320 are made using a voltage sensor, and temperature measurements 310 are made using a temperature sensor. Such sensors are widely known in the art as is the manner in which they are used to take voltage and temperature sensors, and, therefore, a detailed description of the sensors and the measurement is not included herein. Voltage measurements are sent to the system CPU, which then calculates a voltage compensation coefficient 340, similarly temperature measurements are sent to the system CPU which then calculates a temperature compensation coefficient 330. The compensation coefficients are combined 350 and then applied to the ASDSP software 360. The combined voltage and temperature compensation coefficients are sent by the system CPU to the ASDSP program storage memory (as shown by arrow A in FIGS. 2 and 3) to update or adjust the micro-sequence program that controls dataflow through the ASDSP. Thus it is possible to tune the equalization algorithm executed by the ASDSP to compensate for changes in temperature and/or voltage. The process for performing channel equalization then proceeds as described above with reference to FIG. 2 from step 220 onwards.

Voltage and temperature compensation can be applied periodically or when temperature and/or voltage thresholds are breached. Thus the final step 370 in the compensation process involves determining whether correct compensation has been obtained and if so the process ends, If not, then new voltage and temperature measurements are taken as shown in blocks 320 and 310 and the process continues from there.

Preferably the CPU 100 sends the combined voltage and temperature compensation coefficients to the ASDSP 40 in addition to the ASDSP program storage memory 70, so that the ASDSP op-codes may be updated or adjusted accordingly to compensate for the changes in temperature and/or voltage of the transmission system. Although voltage and temperature are specifically mentioned in the example given above, the same method may be used to compensate for other varying physical and/or environmental conditions. Thus the coupling of the CPU 100 to the ASDSP program storage memory 70 enables flexibility in the application of channel equalization and compensation as the ASDSP 40 can be upgraded or reconfigured dynamically by the CPU 100.

Although the system CPU 100 is described above as calculating the voltage and temperature coefficients, another or external CPU may receive the voltage and temperature measurements instead and calculate the voltage and temperature coefficients. Alternatively, the voltage and temperature measurements may be received by the ASDSP 40 which may then calculate the voltage and temperature compensation coefficients and tune the equalization algorithm directly.

The ASDSP 40 also preferably performs frequency domain compensation by performing a discrete time Fourier transform (DTFT) algorithm on the sampled data and characterizing the spectral content of the received waveform. Compensation parameters are applied to the waveform in the frequency domain and then converted back into the time-domain using an inverse DTFT. This technique requires over-sampling of the received waveform, which is not something that is currently employed in conventional SerDes but which may become practice in the future.

Long-tail echo cancellation and cross-talk cancellation techniques may preferably be performed by the ASDSP to further improve the BER.

The ASDSP 40 provides a highly programmable solution to the challenges faced when implementing SerDes at very high transmission rates in order to obtain a working, reliable system capable of operating over long distances with an acceptable BER. The flexibility in architecture offered by the ASDSP 40 of the present invention, provides a notable advantage over state of the art SerDes architectures.

The equalization circuit and method of the present invention can be used in and for transmission systems employing multi-level signaling schemes such as PAM4, duobinary, DME, NRZI.

Figure 4:
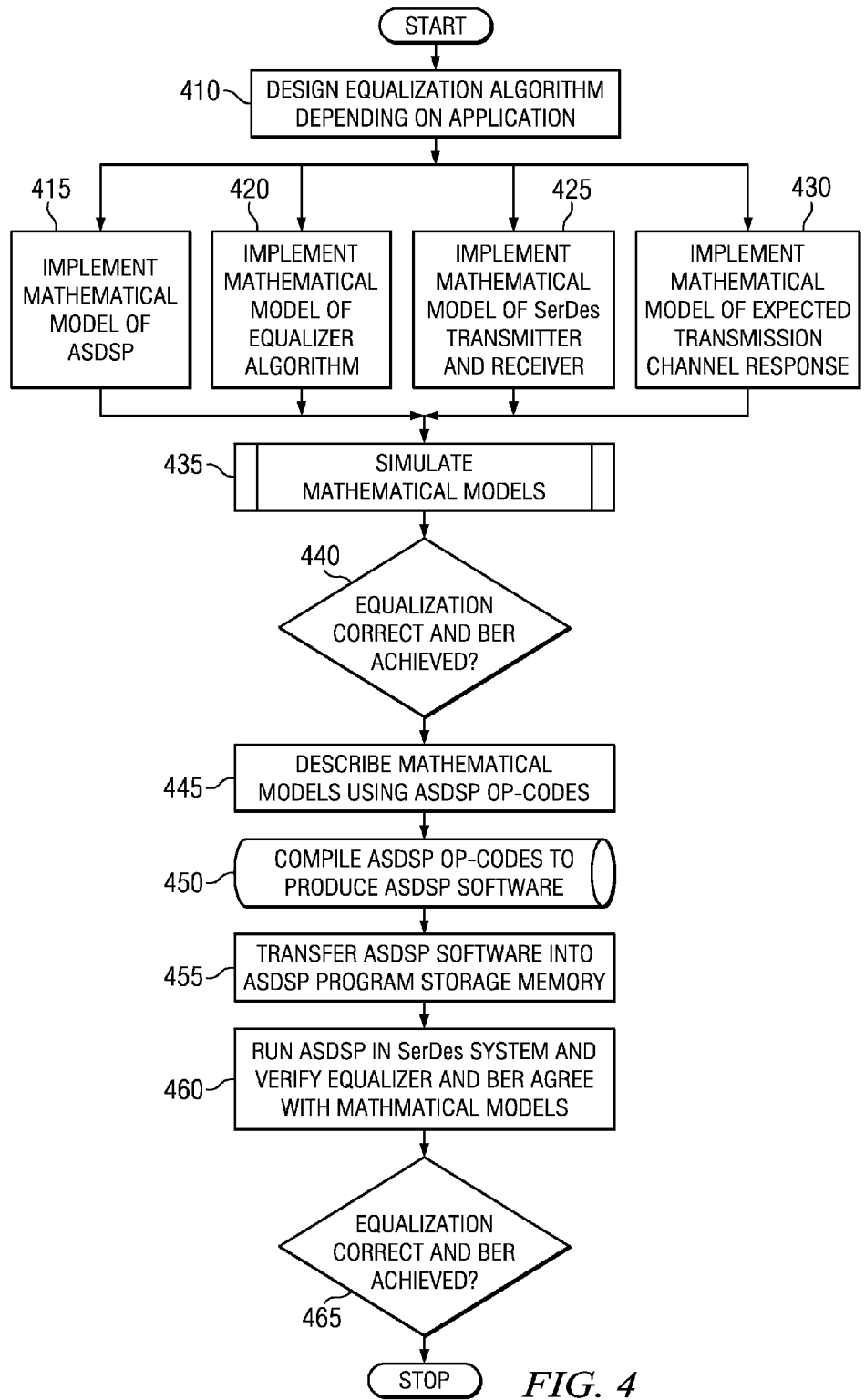
FIG. 4 is a flowchart diagram of the ASDSP software development process for producing the ASDSP software for performing channel equalization in accordance with the preferred embodiment of the invention.

FIG. 4 shows a flowchart of the process for producing the ASDSP software for performing channel equalization using an ASDSP 40 according to a preferred embodiment of the present invention. The process starts by designing an equalization algorithm 410 depending on the particulars of the application and the approximate length of the transmission channel. Next, using this equalization algorithm, mathematical models of the ASDSP, equalization algorithm, SerDes transmitter and Receiver, and expected transmission channel response are implemented, as shown by blocks 415, 420, 425 and 430, respectively. These mathematical models are then simulated 435, and an assessment made as to whether the correct equalization and BER has been achieved 440. If the assessment is negative then the process reverts back to block 410 with the designing of another equalization algorithm. If the assessment is positive, the next step 445 involves describing the mathematical models using ASDSP op-codes. These ASDSP op-codes are then compiled to produce ASDSP software as indicated by block 450, This resulting ASDSP software is transferred into ASDSP program storage memory 455. The next step 460 involves running the ASDSP in the SerDes system, and verifying whether the equalization and BER agree with the mathematical models. A determination is then made whether the correct equalization and BER is achieved 465. If the determination is positive, then the process ends as a suitable equalization algorithm has been produced. If the determination is negative, the process reverts back to block 410 with the designing of another equalization algorithm.

What is claimed:

1. A circuit for performing channel equalisation in a high speed transmission system comprising a transmitter and a receiver, the circuit comprising:
    an application specific digital signal processor, ASDSP, for performing channel equalisation and compensation on digital data received from an analogue-to digital converter of the receiver;
    an ASDSP register for storing equalizer parameters and bit error rate measurements, and coupled between the ASDSP and a system CPU (central processing unit) in a feedback loop for performing channel equalisation at the receiver;
    an ASDSP program storage memory, coupled to and accessible by the ASDSP, for storing an ASDSP micro-sequence program for controlling processing steps for channel equalisation and dataflow through the ASDSP; and
    wherein the ASDSP is operable to select an equalizer and or a clock and data recovery CDR function from a plurality of different equalizer and CDR algorithms, and to execute an application specific set of op-codes for performing the selected equalizer and CDR algorithms based on information received by the ASDSP pertaining to any one of: external or internal adaptations, constraints imposed by the system CPU, and selection criteria comprising optimization criterion stored in the ASDSP register.

2. The circuit as claimed in claim 1, further comprising:
    a system CPU coupled to the ASDSP program storage memory, the system CPU operable to determine whether an optimization criterion is met by the received equalized data signal, and operable to send a control signal to the ASDSP program storage memory to update the micro-sequence program if the optimization criterion is not met by the received equalized data signal.

3. The circuit as claimed in claim 1, wherein the system CPU is coupled to the transmitter and is operable, in response to receiving at least one of an equalizer parameter and bit error measurement from the ASDSP register, to send a control signal to channel compensation circuitry in the transmitter for adjusting the amount of equalisation to be applied to the data signal.

4. The circuit as claimed in claim 1, wherein the CPU is coupled to the transmitter and receiver, and is operable, in response to receiving at least one of an equalizer parameter and a bit error measurement from the ASDSP register, to send a signal to a Decision Feedback Equaliser for adjusting the amount of equalisation to be applied to the data signal.

5. The circuit as claimed in claim 1, wherein the CPU is coupled to the transmitter and receiver, and is operable, in response to receiving at least one of an equalizer parameter and a bit error measurement from the ASDSP register, to send a signal to a Feed Forward Equaliser for adjusting the amount of equalisation to be applied to the data signal.

6. The circuit as claimed in claim 1 wherein the application specific set of op-codes includes op-codes for performing automatic gain control AGC on the received digital signal, and the ASDSP is operable to perform AGC on the received digital data.

7. The circuit as claimed in claim 1, wherein
    the equalizer comprises at least one algorithm selected from: DFE, FFE, Continuous Time Linear Equalizer (CTLE), and electronic dispersion compensation; and
    the CDR function comprises at least one algorithm selected from: Bang-Bang CDR, Mueller-Muller CDR, SETI CDR.

8. The circuit as claimed in claim 1, further comprising at least one input storage buffer memory coupled to the input of ASDSP for buffering incoming digital data to the ASDSP.

9. The circuit as claimed in claim 1, wherein the ASDSP is incorporated within the receiver.

10. The circuit as claimed in claim 1, wherein the high speed transmission system is a SerDes system.

11. A method of performing channel equalisation in a high speed transmission system comprising a transmitter and a receiver, the method comprising the steps of:
    selecting an equalizer and/or a clock and data recovery CDR function from a plurality of different equalizer and CDR algorithms based on information received by an application specific digital signal processor ASDSP pertaining to any one of: external or internal adaptations, constraints imposed by the system CPU (central processing unit), and predetermined operating conditions;
    executing an application specific set of op-codes for performing the selected equalizer and CDR algorithms on digital data received from an analogue-to-digital converter of the receiver, using the application specific digital signal processor ASDSP;

controlling processing steps for channel equalisation and dataflow through the ASDSP using an ASDSP micro-sequence program;

reading equalizer parameters and bit error rate measurements stored in an ASDSP register;

calculating channel equalization and compensation, on a basis of the equalizer parameters and bit error rate measurements, to be applied by the ASDSP to the received digital data at the receiver and to data to be transmitted at the transmitter; and applying channel equalization and compensation to the received digital data at the receiver and to the data to be transmitted at the transmitter.

12. The method as claimed in claim 11, further comprising:
updating the micro-sequence program stored in the ASDSP program storage memory in response to a control signal from a system CPU.

13. The method as claimed in claim 11, further comprising the step:
updating equalizer parameters and bit error rate measurements stored in the ASDSP register in response to a control signal from the ASDSP or a system CPU.

14. The method as claimed in claim 11, wherein the step of applying channel equalization and compensation comprises:
adjusting the transmitter FIR parameters used to apply pre-compensation/feed forward equalization in the transmitter.

15. The method as claimed in claim 11, wherein the step of applying channel equalization and compensation comprises:
applying any of decision feedback equalization, clock and data recovery compensation, and automatic gain control compensation.

16. The method as claimed in claim 11, wherein the high speed transmission system is a SerDes system.

17. The method as claimed in claim 11, wherein
the equalizer comprises at least one algorithm selected from: DFE, FFE, Continuous Time Linear Equalizer (CTLE), and electronic dispersion compensation; and
the CDR function comprises at least one algorithm selected from: Bang-Bang CDR, Mueller-Muller CDR, SETI CDR.

* * * * *